No. 894,509. PATENTED JULY 28, 1908.
A. S. LEUPOLD.
ADVERTISING DEVICE.
APPLICATION FILED JUNE 29, 1907.

WITNESSES

INVENTOR
ARTHUR S. LEUPOLD

UNITED STATES PATENT OFFICE.

ARTHUR S. LEUPOLD, OF MONTREAL, QUEBEC, CANADA.

ADVERTISING DEVICE.

No. 894,509.　　　Specification of Letters Patent.　　　Patented July 28, 1908.

Application filed June 29, 1907. Serial No. 381,420.

*To all whom it may concern:*

Be it known that I, ARTHUR S. LEUPOLD, of the city of Montreal, in the Province of Quebec and Dominion of Canada, have invented certain new and useful Improvements in Advertising Devices, of which the following is a full, clear, and exact description.

My invention relates to improvements in advertising devices and its object is to produce a comparatively inexpensive illuminated sign in which the advertising matter, while stationary, has the appearance of being in constant motion to a passer by.

A further object is to provide a sign which may be illuminated by sunlight during the day to produce the same effect as when artificially illuminated at night.

To accomplish these objects, I provide a casing having an opaque or stained glass front on which the advertisement is portrayed transparently or translucently. Within the casing is a frame containing a number of prisms or slides of colored glass adapted to deflect rays of colored light through the advertisement. One or more lamps backed by a suitable reflector illuminate the device at night, while a transparent glass top and back permit sunlight to shine onto and through the prisms during the day. The illusion of motion of the advertisement is due to the constantly changing angle at which a passer by views the sign, thereby bringing differently colored rays of light within his line of vision.

Figure 1:
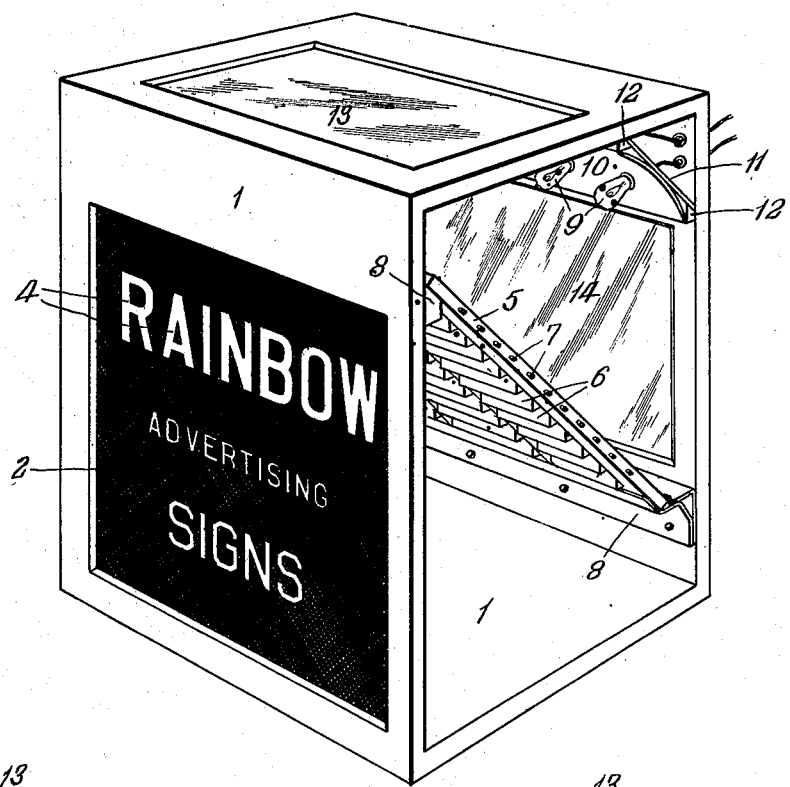
Figure 2:
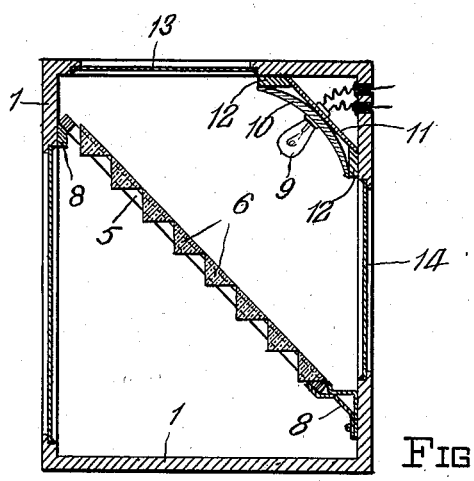
Figure 3:
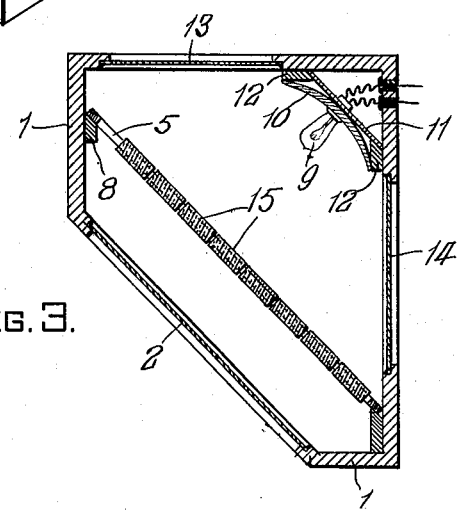

In the drawings which illustrate my invention:—Figure 1 is a perspective view of the device with one of the sides of the casing removed to show the arrangement of the interior. Fig. 2 is a vertical sectional view through the device from front to back. Fig. 3 is a view similar to Fig. 2 but shows an alternative form adapted for overhead use.

In the above defined figures, 1 designates a casing provided with a front 2 of opaque or stained glass on which the letters or design 4 of an advertisement appear transparently. A rack or frame 5 is situated behind the glass front 2 and preferably at an angle thereto, and contains a number of prisms or slides 6 of colored or stained glass, preferably arranged in rows vertically and horizontally, and secured to the rack by means of screws 7, or any other suitable means. The rack is supported in position by any suitable form of brackets 8. A plurality of lamps 9, preferably electric, are located along the upper back edge of the casing and are backed by a suitable reflector 10 adapted to concentrate their light on the prisms 6. The lamps and reflector are carried by a frame 11 mounted on brackets or guides 12. Panes of transparent glass 13 and 14 are placed in the top and back of the casing respectively, in order to admit sunlight during the day to shine through the prisms 6 and illuminate the advertisement.

The construction shown in Fig. 3, is adapted to signs which require to be placed at a considerable height and only differs from the form shown in Figs. 1 and 2 in the position of the front 2 which is at an angle to the back of the casing and parallel to the prism frame 5. In this form of construction the prisms 6 may be replaced by plain slides 15 since the light rays require no deflector.

It will be obvious that this device will provide a very inexpensive and attractive advertising sign, the letters of which to a passer-by will appear in motion on account of the constantly changing light passing therethrough from the colored prisms.

Having thus described my invention what I claim is:—

1. A device of the character described comprising a casing, an opaque front therefor having a sign in transparent characters, a plurality of prisms of colored glass located behind said front, and means for illuminating the transparent characters through said prisms.

2. A device of the character described comprising a casing, an opaque front therefor having a sign transparently depicted thereon, a frame located behind said front and at an angle thereto, a plurality of prisms of colored glass in said frame, and means for illuminating said sign through the prisms.

3. A device of the character described comprising a casing, an opaque front therefor having a sign depicted thereon, a source of light within said casing, a frame located behind said opaque front and at an angle thereto, a plurality of prisms of colored glass arranged in vertical and horizontal rows in said frame, and a reflector behind said source of light adapted to project the light through said prisms to the front of the casing.

4. A device of the character described comprising a casing, an opaque front therefor having a sign transparently depicted thereon, a frame located within said casing and at an angle to the front, a plurality of prisms of colored glass arranged in horizontal and vertical rows in said frame, means for securing the prisms to the frame, a plurality of lamps, a reflector adapted to direct the light from said lamps on to the prisms, and a transparent top and back for said casing.

In witness whereof I have hereunto set my hand in the presence of two witnesses.

ARTHUR S. LEUPOLD.

Witnesses:
STUART R. W. ALLEN,
WILLIAM G. ARMSTRONG.